United States Patent [19]

Pastor

[11] Patent Number: 4,498,888
[45] Date of Patent: Feb. 12, 1985

[54] DRIVE ASSEMBLY COUPLING
[75] Inventor: William Pastor, Torrington, Conn.
[73] Assignee: The Torrington Company, Torrington, Conn.
[21] Appl. No.: 474,152
[22] Filed: Mar. 10, 1983
[51] Int. Cl.³ .............................................. F16D 3/26
[52] U.S. Cl. ..................................... 464/112; 464/136
[58] Field of Search .............. 464/112, 125, 134, 136, 464/905

[56] References Cited
U.S. PATENT DOCUMENTS

| | | | |
|---|---|---|---|
| 105,696 | 7/1870 | Keller | 464/112 |
| 1,141,211 | 6/1915 | Prescott | 464/136 X |
| 1,216,508 | 2/1917 | Spade | 464/125 |
| 2,271,974 | 2/1942 | Greiner | 464/125 |
| 2,997,864 | 8/1961 | Rueb | 464/112 |
| 3,064,453 | 11/1962 | Barsness et al. | 464/125 |

FOREIGN PATENT DOCUMENTS 313680  6/1929  United Kingdom ............... 464/112

Primary Examiner—Stuart S. Levy
Assistant Examiner—Thomas R. Hannon
Attorney, Agent, or Firm—F. S. Troidl

[57] ABSTRACT

The driving shaft has an end shaped to overlap the end of the driven shaft. The two shafts are interconnected by a coupling member. The coupling member is connected to the driven shaft by a long pin. The overlapping portion of the driving shaft is connected to the coupling member by two short pins.

4 Claims, 4 Drawing Figures

U.S. Patent  Feb. 12, 1985  4,498,888
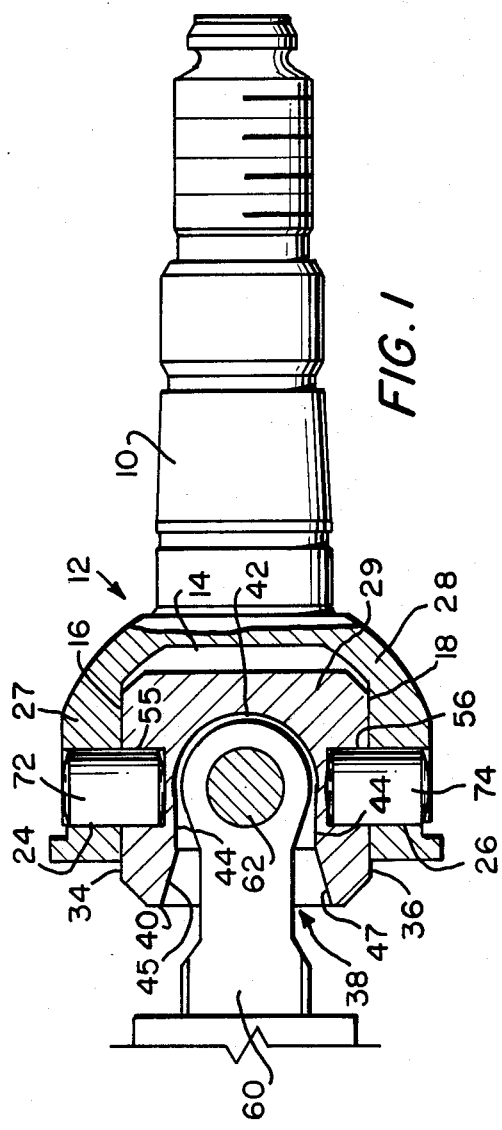
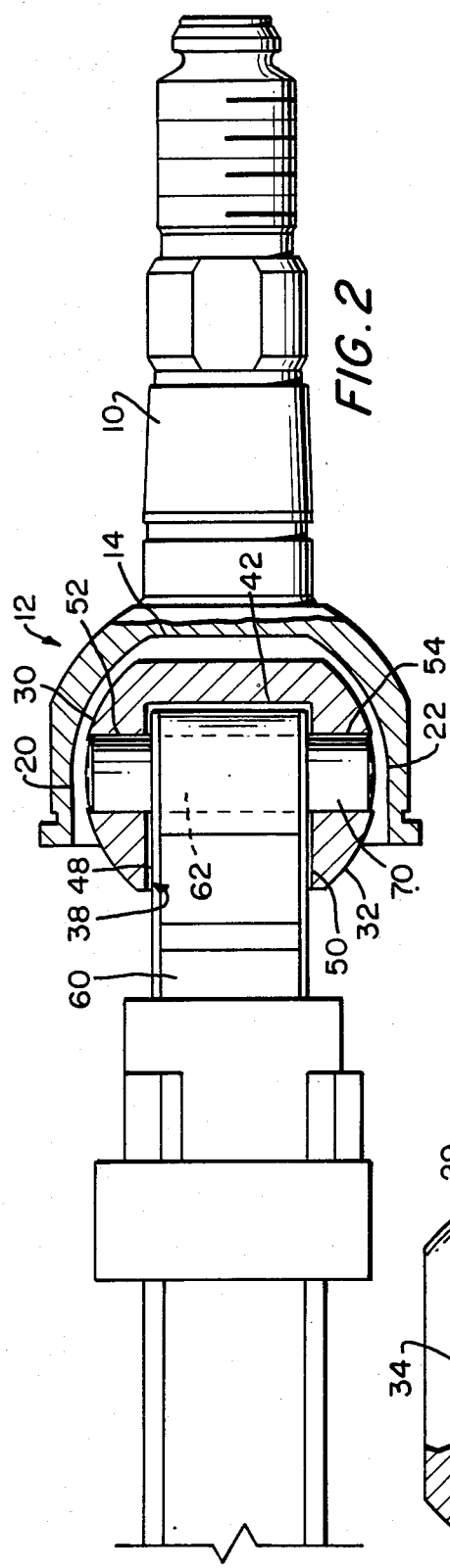
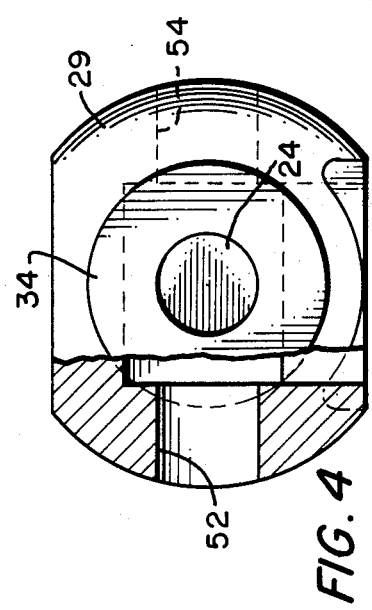
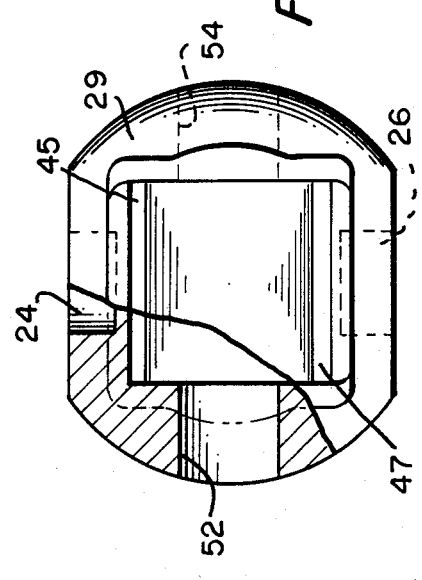

DRIVE ASSEMBLY COUPLING

This invention relates to universal joints.

In most universal joints, torque is transmitted from one yoke to another through two perpendicular axes which pass through a hub. The hub may be made from metal or plastic and may range in geometry from square to spherical. As the universal joint rotates in other than a zero angle, it pivots on these two axes.

This invention is a simplified structure of universal joint which comprises a one piece specially shaped coupling member which directly couples the driving shaft to the driven shaft.

Briefly described, the invention comprises a coupling member connecting together in an overlapping relationship, the end portions of driving and driven shafts. The coupling member has a slot in one side which receives the end portion of the driven shaft. A long pin is received in appropriate aperatures in the coupling member. The pin extends across the slot and through an appropriate aperture in the driven shaft end portion. A pair of diametrically opposite short pins are received in appropriate apertures in the coupling member with their axes aligned and perpendicular to the axes of the long pin. Each short pin extends into an appropriate aperture in the driving shaft end portion.

The invention, as well as its many advantages, may be further understood by reference to the following detailed description and drawings in which:

FIG. 1 is a side view, partly in section, of a preferred embodiment of the invention;

FIG. 2 is a top view, partly in section, of the embodiment of FIG. 1;

FIG. 3 is a front view of the coupling member of the preferred embodiment of FIG. 1 and FIG. 2; and FIG. 4 is a top view of the coupling member of FIG. 3.

In the various figures, like parts are referred to by like numbers.

Referring to the drawings, and more particularly, to FIG. 1 and FIG. 2, the new drive assembly includes a drive shaft 10 which has an approximately bell-shaped end 12. The inside surface of the bell-shaped end portion 12 is formed by a back wall 14, top and bottom straight walls 16 and 18, respectively, and curved side walls 20 and 22 (see FIG. 2).

Aligned top and bottom apertures 24 and 26, respectively, extend perpendicularly through the top 27 and bottom 28, respectively, of the bell-shaped end 12.

The coupling member 29 is received within the bell-shaped end portion 12 of the drive shaft 10. The coupling member is provided with two diametrically opposite curved side surfaces 30 and 32 (see FIG. 2) which are adjacent the curved surfaces 20 and 22 of the bell-shaped end portion 12. The coupling member 29 also has top and bottom annular flat surfaces 34 and 36, respectively, (see FIG. 1, FIG. 3, and FIG. 4) which abut the straight inside surface portions 16 and 18, respectively, of the bell-shaped end portion 12 of the drive shaft 10.

A slot 38 is provided in the front face 40 of the coupling member 29. The front face 40 faces away from the bell-shaped end portion 12 of the drive shaft 10. The slot 38 is formed by a curved rear surface 42, top and bottom flat surfaces 44 and 46, and side flat surfaces 48 and 50 (see FIG. 2). Extending from the top and bottom flat surfaces 44 and 46, are surfaces 45, and 47, respectively, which are inclined outwardly from flat surfaces 44 and 46, respectively.

Aligned side apertures 52 and 54 are centrally located in the side curved surfaces of the coupling member 29 and extend perpendicularly through the coupling member into the slot 38. Coupling member 29 also has a top aperture 55 and a bottom aperture 56 aligned with apertures 24 and 26, respectively, in the bell-shaped end portion of drive shaft 10. The axes of all the apertures in the coupling member 29 and the bell-shaped end portion 12 of the drive shaft 10 meet at a common point. This prevents the shafts from acting wobbly due to rotational velocity changes from one axis to another axis.

A driven shaft 60 has one end thereof received in the coupling member slot 38. The end of the driven shaft 60 is curved at its extreme end to conform with the curved back wall 42 of the slot 38. The thickness of the driven shaft 60 adjacent the inclined surfaces 45 and 47 of the slot 38 is such that drive shaft 10 and coupling member 29 are permitted limited pivotal movement with respect to driven shaft 60.

The curved extreme end portion of the driven shaft 60 is provided with a transverse aperture 62 which is aligned with the side apertures 52 and 54 of the coupling member 29.

A long pin 70 is received in the coupling member side apertures 52 and 54. The long pin 70 extends across the slot 38 and through the driven shaft aperture 62. Short pins 72 and 74 are received in the top aperture 24 and bottom aperture 26, respectively, of the bell-shaped portion 12 of driving shaft 10. Each short pin 72 and 74 also extends into the apertures 55 and 56, respectively, of the coupling member 29.

The coupling member 29 may be made from either metal or plastic. This new drive assembly may be used for the same purposes as any other U-Joint arrangment. However, one use for which this drive assembly is particularly suited is with a vehicle driving wheel column where the driving wheel may be tilted to be more comfortable for the driver. In such case, the wheel will be attached to the top of the shaft 10 and the inclined surfaces 45 and 47 of the slot 38 may extend at an angle of, say 15 degrees, to the axis of the shaft 10. This would provide a limited amount of tilt of the driving wheel with respect to the driven shaft 60. The drive shaft 10 and coupling member 29 may be pivoted a limited amount about the long pin 70.

I claim:

1. A drive assembly for a vehicle driving wheel column with a tiltable driving wheel comprising: a driving wheel shaft having an approximately bell-shaped end portion, the inside surface of the bell-shaped end portion having two diametrically opposite curved side surfaces, and two diametrically opposite flat top and bottom surfaces; a driven shaft; a solid coupling member received within said bell-shaped end portion and connecting together the driving wheel shaft and the driven shaft; the coupling member having curved side surfaces adjacent and spaced from the curved side inside surfaces of the bell-shaped end portion of the driving wheel shaft, top and bottom flat surfaces adjacent and touching the flat inside surfaces of the bell-shaped end portion of the driving wheel shaft and a slot on one side and receiving in said slot the end portion of the driven shaft the surfaces forming said slot being shaped to permit limited upward or downward pivotal movement, only of the coupling member with respect to the driven shaft; a long pin received in appropriate apertures in the coupling member, said pin extending across the slot and through an appropriate aperture n the driven shaft end portion; and a pair of diametrically opposite short pins received in appropriate apertures in the coupling member with their axes aligned and perpendicular to the axis of the long pin, each short pin also extending into an appropriate aperture in the bell-shaped end portion, whereby the driven wheel shaft and the coupling member, as a unit, may be pivoted a limited amount about the lon pin; the solid coupling member being completely solid except for said slot and said apertures in the coupling member.

2. A drive assembly in accordance with claim 1 wherein: the coupling member is molded in plastic material.

3. A drive assembly in accordance with claim 2 wherein: the slot has diametricaly opposed inclined surfaces shaped and positioned to permit limited pivotal movement of the driving wheel shaft and coupling member about the long pin.

4. A drive assembly for a vehicle driving wheel column with a tiltable driving wheel comprising: a driving wheel shaft having an approximately bell-shaped end portion, the inside surface of the bell-shaped end portion having two diametrically opposite curved side surfaces, and two diametrically opposite flat top and bottom surfaces, said bell-shaped end portion also having aligned top and bottom apertures, each extending perpendicular through the bell-shaped end portion to the flat top and bottom inside surfaces, respectively; a solid coupling member received within said bell-shaped end portion, the coupling member having curved side surfaces adjacent and spaced from the curved side inside surfaces of the bell-shaped end portion of the driving wheel shaft, top and bottom flat surfaces adjacent and touching the flat inside surfaces of the bell-shaped end portion of the driving wheel shaft, and a slot in the side of the coupling member facing away from the bell-shaped end portion of the driving wheel shaft, said slot formed by a curved back surface, top and bottom flat surfaces, top and bottom inclined flat surfaces extending outwardly from the top and bottom flat surfaces, respectively, and side surfaces, each adjacent a coupling member side curved surface; the coupling member also having aligned side apertures, each extending perpendicularly through the coupling member into the slot; the coupling member also having top and bottom apertures aligned with the apertures in the bell-shaped end portion of the driving wheel shaft, the axes of all the apertures in the coupling member and the bell-shaped end portion of the driving wheel shaft meeting at a common point; a driven shaft having an end thereof received in the coupling member slot, said end being shaped with respect to the top and bottom inclined flat surfaces of the slot to permit limited upward or downward pivotal movement, only, of the coupling member with respect to the driven shaft, said driven shaft end also having an aperture extending through it aligned with the coupling member side apertures; a long pin received in the coupling member side apertures, said pin extending across the slot and through the driven shaft aperture; and a short pin received in each coupling member top and bottom aperture, each short pin also extending into one of said apertures in the bell-shaped end portion of the driving wheel shaft, whereby the driving wheel shaft and the coupling member, as a unit, may be pivoted a limited amount about the long pin, the solid coupling member being completely solid except for said slot and said apertures in the coupling member.

* * * * *